US011004358B2

(12) United States Patent
Matthews

(10) Patent No.: US 11,004,358 B2
(45) Date of Patent: May 11, 2021

(54) VISUAL AND KINESTHETIC METHOD AND EDUCATIONAL KIT FOR SOLVING ALGEBRAIC LINEAR EQUATIONS INVOLVING AN UNKNOWN VARIABLE

(71) Applicant: Jeffrey B. Matthews, Chattanooga, TN (US)

(72) Inventor: Jeffrey B. Matthews, Chattanooga, TN (US)

( * ) Notice: Subject to any disclaimer, the term of this patent is extended or adjusted under 35 U.S.C. 154(b) by 342 days.

(21) Appl. No.: 15/881,097

(22) Filed: Jan. 26, 2018

(65) Prior Publication Data

US 2018/0151090 A1 May 31, 2018

Related U.S. Application Data

(63) Continuation-in-part of application No. 14/693,840, filed on Apr. 22, 2015, now abandoned.

(51) Int. Cl.
*G09B 23/02* (2006.01)
*G09B 19/02* (2006.01)

(52) U.S. Cl.
CPC ............. *G09B 23/02* (2013.01); *G09B 19/02* (2013.01)

(58) Field of Classification Search
CPC .......... G09B 19/02; G09B 23/02; G09B 1/28
See application file for complete search history.

(56) References Cited

U.S. PATENT DOCUMENTS

| | | | | |
|---|---|---|---|---|
| 4,713,009 A * | 12/1987 | Borenson | ............... | G09B 23/02 434/188 |
| 5,039,603 A * | 8/1991 | Pocius | .................. | G09B 19/02 434/188 |

\* cited by examiner

*Primary Examiner* — Eddy Saint-Vil
(74) *Attorney, Agent, or Firm* — Michael J. Foycik, Jr.

(57) ABSTRACT

An educational kit for teaching mathematics includes easily manipulated elements, which serve as cognitive reinforcement during the learning process. These physical elements are used in conjunction with a set of grouping rules. The educational kit and corresponding grouping rules determine a model and process to represent both an algebraic linear equation and its algebraic solution. A simple element, such as an item/figure including a variable "X", is used to denote the unknown quantity. An item/figure including a number is used to represent a numerical value. These items/figures contain the exact elements used to form the expressions of the linear equation and are not items/figures that simulate the elements that form the expressions of the equation. By the use of this educational kit and associated grouping, students learn to simplify a given linear algebraic equation to the point where the solution is obvious.

5 Claims, 6 Drawing Sheets

100

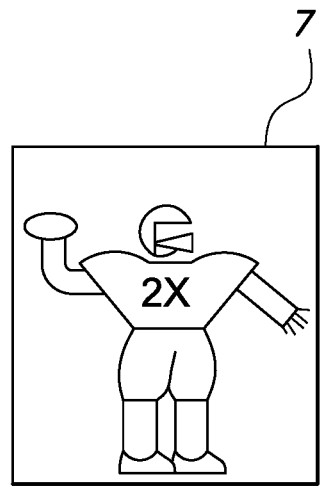
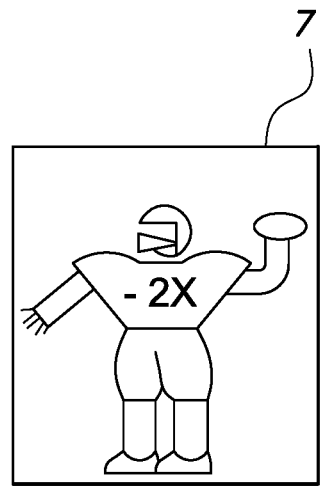
FIG. 1A    FIG. 1B
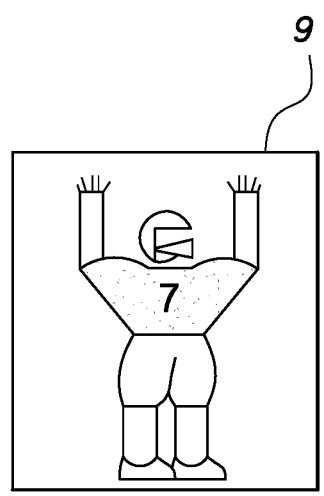
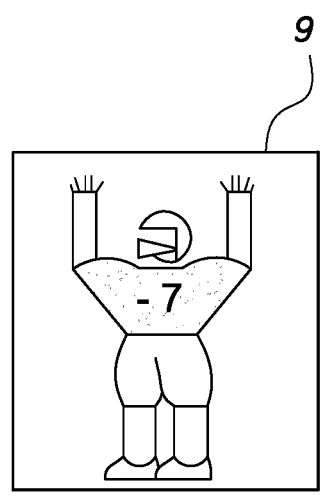
FIG. 1C    FIG. 1D

VISUAL AND KINESTHETIC METHOD AND EDUCATIONAL KIT FOR SOLVING ALGEBRAIC LINEAR EQUATIONS INVOLVING AN UNKNOWN VARIABLE

CROSS REFERENCE TO RELATED APPLICATIONS

This is a Continuation-in-Part of pending application U.S. Ser. No. 14/693,840 filed Apr. 22, 2015, having inventor Jeffrey B. Matthews, having the same title as the present application. The disclosure of this application is hereby expressly incorporated herein by reference thereto.

STATEMENT REGARDING FEDERALLY SPONSORED RESEARCH OR DEVELOPMENT

Not applicable.

FIELD OF THE INVENTION

The present invention relates to an educational kit for teaching Mathematics, specifically algebraic concepts for students to solve simple linear algebraic equations.

BACKGROUND OF THE INVENTION

Because algebra may sometimes seem abstract in that individuals may not be able to connect the theoretical idea of a mathematical concept to its physical or concrete existence, individuals may experience roadblocks to their comprehension of basic mathematical concepts. Several researchers advocate the use of concrete manipulatives in mathematics education as a means of bridging the transition from concrete to abstract mathematics. (Magruder 2012 page 1)

Full citation listings are set forth further below.

"Solving linear equations is an important algebraic concept. According to the Common Core State Standards for Mathematics (CCSSM) students must be able to solve equations while understanding the process, justifying, and explaining the steps (CCSSO, 2010). The National Council of Teachers of Mathematics (NCTM) places a heavy emphasis on conceptual understanding of solving equations within their standards as well (NCTM, 2000). Algebra tasks are often difficult for students; the transition from concrete mathematics to abstract concepts is partially responsible for this difficulty (Kilpatrick & Izsak, 2008). Solving equations is a particularly important concept in algebra and one that causes confusion for students (Cai & Moyer, 2008). (Magruder 2012 page 1)

Students face many challenges as they study algebra. One important area of study within the subject of algebra is solving linear equations. Within the topic of solving linear equations, students struggle to develop symbolic understanding (Kilpatrick & Izsak, 2008; Poon & Leung, 2010), to form an accurate meaning of the equal sign (Knuth, Stephens, McNeil, & Alibali, 2006), and to balance conceptual and procedural knowledge (Capraro & Joffrion, 2006; Siegler, 2003; Star, 2005). Recommendations put forth by the NCTM and standards presented by CCSSM include solving equations as important components. Additionally, both organizations advocate modeling with mathematics; one such model is manipulatives." (Magruder 2012 page 2).

In order to achieve the ultimate goal of student learning it is important to use a combination of teaching methods and to make the classroom environment as stimulating and interactive as possible. Students have different ways and styles of learning. Two learning styles in which students may be classified whereby manipulatives are used as a teaching tool are visual learners and kinesthetic or tactile learners. Visual learners learn visually by means of charts, graphs, and pictures. Kinesthetic/Tactile learners learn by doing, by touching, by experiencing, by manipulating objects. Because of these different yet similar learning styles, in that each uses an additional physical element to convey a concept, it is important for teachers to use activities that caters to each of these learning styles. By doing so it will allow students who learn visually and kinesthetically to succeed in their classes.

The prior art has taught a variety of techniques to address this situation. "Strobbe (U.S. Pat. No. 3,514,873) devised a board that allowed the arrangement of elements for counting purposes. However, it does not provide for expression evaluation nor does it possess the necessary features to allow the teaching of counting by partitioning. Jordan and Fiske (U.S. Pat. No. 3,423,849) created a visual representation of equality by filling equal areas with rectangles of various sizes. However, there is neither intention nor capability with this device for either solving the equation or for determining how the various-sized rectangles actually count the same type of object. Pierson (U.S. Pat. No. 3,235,975) visually established equations using a pegboard with square and circular inserts to represent variables and constants. However, the "equality" thus represented is an abstraction, as the objects utilized do not actually perform a counting function. Borenson (U.S. Pat. No. 4,713,009) devised a pseudo-balance to represent an equation, with pawns signifying variables and numbered cubes indicating constants, with a contrasting color used for negative values. Once again, however, the concrete manifestation of the equation has its origin in an abstraction in that there is no perceivable connection between what the pawns count and what the numbered cubed count. Moreover, each cube can be made to indicate a different value by merely rotating its upper face so that the actual counting thus represented is an abstraction. Also, the balance actually presents a distorted reality in that it will always indicate a situation of balance even if the student performs an incorrect maneuver." Pocius (U.S. Pat. No. 5,039,603) devised a system in which two surfaces are used to display manipulable elements arranged on each surface to simulate a linear equation. However, like Borenson (U.S. Pat. No. 4,713,009), the manipulable elements Pocius uses simulate the elements that form the expressions of the equation, thus the concrete manifestation of the equation has its origin in an abstraction.

Accordingly there exist a need for a method and kit for helping students to overcome the challenges of solving algebraic linear equations. Furthermore there is a need for a method and kit that will allow students to make the transition from concrete mathematics to abstract concepts that eliminates the concrete manifestation of the equation having its origin in an abstraction.

A listing of citations referenced in the foregoing is provided as follows:

Printed Publications

Magruder, Robin L., "Solving Linear Equations: A Comparison of Concrete and Virtual Manipulatives In Middle School Mathematics" (2012). *Theses and Dissertations-Curriculum and Instruction. Paper* 2. http://uknowledge.uky.edu/edc_etds/2

Referenced by Robin L. Magruder:

Cai, J., & Moyer, P. (2008). Developing algebraic thinking in earlier grades: Some insights from international comparative studies. In C. E. Greenes (Ed.), *Algebra and algebraic thinking in school mathematics* (pp. 169-179), Reston, Va.: National Council of Teachers of Mathematics.

Capraro, M. M., & Joffrion, H. (2006). Algebraic equations: Can middle-school students meaningfully translate from words to mathematical symbols? *Reading Psychology*, 27, 147-164. doi:10.101080/02702710600642467

Common Core State Standards Initiative. (2011). from http://www.corestandards.org/thestandards Kilpatrick, J., & Izsak, A. (2008). A history of algebra in the school curriculum. In C. E. Greenes (Ed.), *Algebra and algebraic thinking in school mathematics* (pp. 3-18). Reston, Va.: National Council of Teachers of Mathematics.

Knuth, E. J., Stephens, A. C., McNeil, N. M., & Alibali, M. W. (2006). Does understanding the equal sign matter? Evidence from solving equations. *Journal of Research in Mathematics Education*. 37, 297-312.

National Council of Teachers of Mathematics (2010). *Principles and standards for school mathematics*. Reston, Va.: National Council of Teachers of Mathematics.

Poon, K., & Leung, C. (2010). Pilot study on algebra learning among junior secondary student. *International Journal of Mathematics Education in Science and Technology*. 41,49-62.

SUMMARY OF THE INVENTION

The inability to transition from concrete mathematics to abstract concepts is a contributor to an individual's difficulty to solve simple linear equations. The present invention is intended to remove this barrier that prohibits students from understanding the mathematical concept to solving an algebraic linear equation. This is accomplished by creating a way in which individuals can make a connection to the abstract nature of linear equations by using a physical or concrete model whereby solving algebraic equations become fun and easy. To accomplish this an educational kit must be used that will allow individuals to have a model that will allow them to make a connection to the abstract. By using the educational kit of the present invention, individuals can learn basic algebraic concepts and the methods of solving algebraic equations that once seemed difficult and unattainable. This educational kit and the teaching methodology that accompanies it thus constitute an educational innovation. Additionally, there is as exact physical representation of algebraic equation, whereby the concrete manifestation of the equation does not have its origin in an abstraction. The items/figures of the kit contain the exact elements used to form the expressions of the linear equation and are not items/figures that simulate the elements that form the expressions of the equation. This is a great advantage when compared to other products that uses other means to represent an equation whose origin is in an abstraction. Another advantage is the kit and teaching method introduces a fun way to solve equations by conveying mathematical concepts to individuals by utilizing their interest in sports and simulating a competition between two opposing teams. This gives the individual the mindset that he or she is playing a game associated with a competitive sport. To solve a given equation the individuals model an equation by using cards representing opposing teams, then proceed to solving the equation by simply grouping the opposing teams on opposite sides on the playing field and using the rules of algebra (math) to solve for the unknown variable. The sport field is used to show that there are two sides of an equation denoted by an equal sign marking the center of the field. By using the immediate educational kit, an individual will be able to find solutions to such equations as $$4x+2x+5=2x+13, 5x-x+4=-2x+16, \text{ and } 2(x+6)+3x=4x+15.$$

That one who struggles with linear equations can solve such equations at all is a tribute to the power available to students when an abstract concept is presented through a physical model that they can readily grasp and manipulate.

In accordance with the present invention, there is provided a set of items/figures representing an unknown amount including the variable "X", and a set of items/figures representing numerical values. Individuals set about solving an algebraic equation, containing an unknown amount, "X". The items/figures are used to represent equations and are easily manipulated in forming a given algebraic equation. The items/figures including the variable "X" represents the unknown amount and the items/figures including only the numbers represents numerical amounts. These parts combined with a teaching methodology where students are taught to represent algebraic equations and then solve them by applying the concept of separating and grouping like items/figures on opposite sides, whereby making abstract techniques for solving for an unknown variable, concrete. To accomplish this an educational kit must be used that will allow individuals to have a model that will allow them to make a connection to the abstract. This is accomplished by allowing the individual to model equations visually and manipulatively thus aiding in conceptual understanding. This educational kit and teaching method accomplishes this task by using items/figures by providing a visual as well as a manipulative means of modeling and solving linear equations that is easily and readably available to them. Whereby mathematical concepts are conveyed to individuals in a manner to which they can easily relate by utilizing their understanding of recognizing and grouping like items/figures, thus connecting an abstract mathematical concept to a concrete concept. Additionally the objective of the present invention is to provide an educational kit and method for teaching individuals how to solve simple linear algebraic equations. Other objectives of the present invention are to provide a learning system for algebra that (a) makes the subject easy for students to learn, (b) provide individuals with a marvelous sense of mathematical ability and self-confidence, (c) increase an individuals' mathematical interest, (d) lays a concrete, intuitive foundation of what equations are all about, and (e) provides an important step in improving Mathematics education for all individuals.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

The invention is directed to an educational kit for solving a given linear algebraic equation having a solution, comprising a plurality of non-masking objects, each of said plurality of non-masking objects respectively representing a unit amount of an unknown quantity by mirroring/duplicating said unit amount of an unknown quantity. The invention further includes a plurality of non-counting unit objects, each of said plurality of non-counting unit objects representing a numerical value by mirroring/duplicating said numerical value, without use of masking said non-counting unit objects, whereby said non-counting unit objects with numerical values and said non-masking objects with unit amounts of an unknown quantity are arranged to form said given linear algebraic equation by mirroring/duplicating said given linear algebraic equation without the use of masking said non-counting unit objects and thereafter rearranged according to rules of movement in order to simplify said given linear algebraic equation without the use of masking said non-counting unit objects until the value of the unknown quantity is obvious, all said non-masking objects and said non-counting unit objects being the only articles used for representing elements of said given linear algebraic equation without any indicator means for representing said given linear algebraic equation by mathematical operations.

Other objects and advantages of the present invention will be more readily apparent from the following detailed description when read in conjunction with the accompanying drawings.

BRIEF DESCRIPTION OF THE DRAWINGS

FIG. 1A is a front view of a figure used with the kit of FIG. 1.

FIG. 1B is a rear view of the figure shown in FIG. 1A, used with the kit of FIG. 1.

FIG. 1C is a front view of a second figure used with the kit of FIG. 1.

FIG. 1D is a rear view of the figure shown in FIG. 1C, used with the kit of FIG. 1.

FIG. 3A and FIG. 3B together show a step-by-step process for moving these items/figures representing a unit amount of an unknown quantity including a variable "X" and items/figures representing numerical values to simplify and solve the given equation, in which FIG. 3A depicts a first step and FIG. 3B depicts a second step.

DETAILED DESCRIPTION OF THE INVENTION

Figure 1:
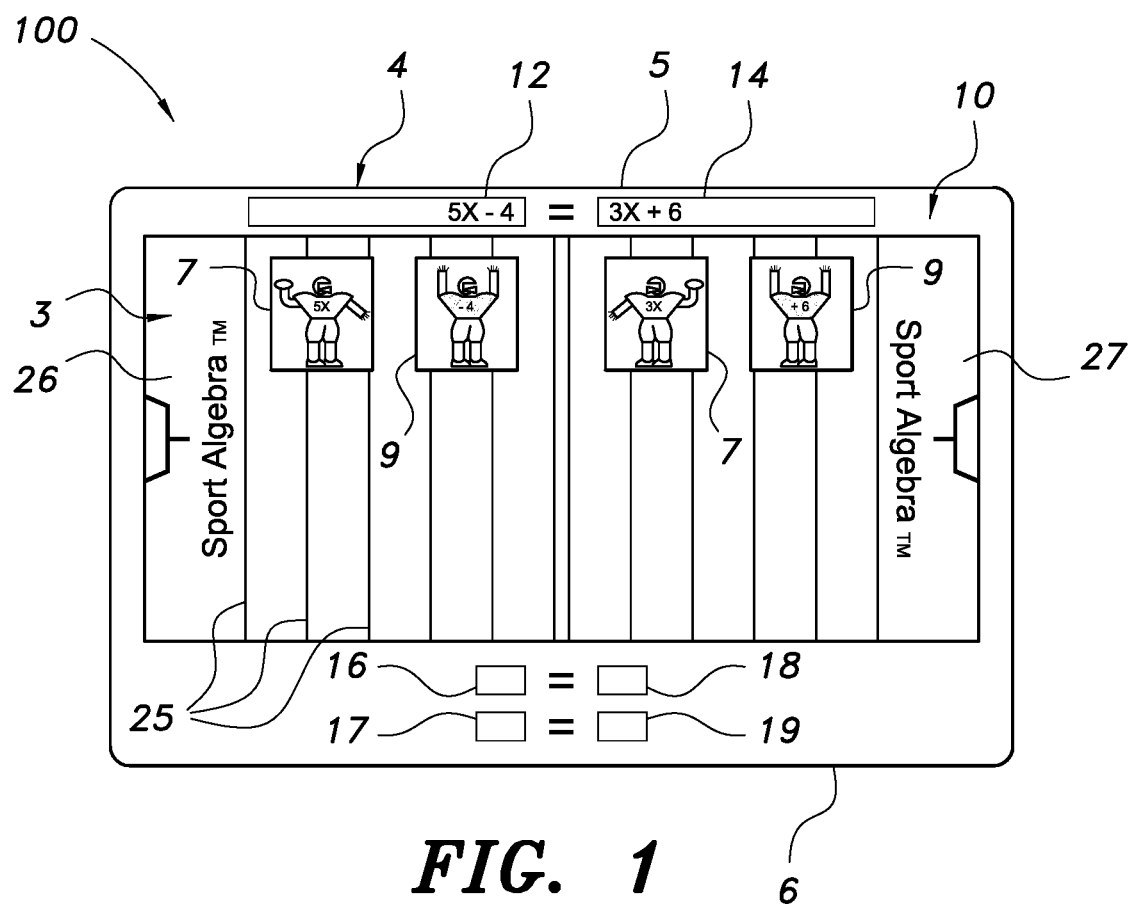
FIG. 1 is an isometric view of a kit, which can be used as a demonstration for teaching.

FIG. 1 is an isometric view of a kit 100, which can be used as a demonstration for teaching. The kit 100 includes a display board 4 having a depiction of a playing field 3. The display board 4 has a top edge 5, a bottom edge 6, and a border region 10 which surrounds the playing field 3. The display board 4 includes a front surface which can be written upon; examples of such types of surfaces that are commonly used include dry-erase boards, white boards, and chalk boards. Other types of display boards known to any one having skill in the display board arts, are contemplated as being within the scope of the present invention.

A box 12 in the border region 10, disposed near the top edge 5, is used to write the left-hand side of an equation. A box 14 in the border region 10, disposed near the top edge 5, is used to write the right-hand side of an equation. An equal sign is printed on the display board 4 between the box 12 and the box 14.

A box 16 in the border region 10, disposed near the bottom edge 6, is used to write the sum total of the variable (e.g., the variable x as shown in FIG. 1) amounts based on the contents of the boxes 12 and 14. A box 18 in the border region 10, disposed near the bottom edge 6, is used to write the sum total of the numerical amounts based on the contents of the boxest 12 and 14. An equal sign is printed on the display board 4 between the box 16 and the box 18.

A box 17 in the border region 10, disposed beneath the box 16, is where the single variable (e.g. "x" in this example) is written. A box 19 in the border region 10, disposed beneath the box 18, is where the numerical solution of the equation is written as a numerical value.

The playing field 3 is illustrated in FIG. 1 having indicia 26 near a goal post at the left side of the playing field 3, and having indicia 27 near a goal post on the right side of the playing field 3. A plurality of parallel grid lines 25 are shown, such that in this example the playing field 3 simulates a football field. An item 7 (also denoted as "figure 7" in the following) is removably disposed on the left side of the playing field 3, and bears a portion of an equation having the unknown variable (here, "x"). An item 9 (also denoted as "figure 9" in the following) is removably disposed on the left side of the playing field 3, and bears a portion of an equation having a numerical amount. Another item 7 is removably disposed on the right side of the playing field 3, and bears a portion of an equation having the unknown variable (here, "x").

Another item 9 is removably disposed on the right side of the playing field 3, and bears a portion of an equation having a numerical amount. It can be seen that the combination of items 7 and items 9 defines an equation in one variable (here "x") that is to be solved. The items 7 and 9 are preferably cards or placards, bearing indicia. The items 7 and 9 can be adhered to the playing field 3 by known types of detachable attachment means such as magnets, static electricity, hook-and-loop fasteners, pins, and the like. Or, the items 7 and 9 can be supported on the playing field 3, as by ledges, recesses, and/or by other structural connectors that permit manual attachment and detachment. On another embodiment, the display board 4 is simply laid flat on a surface, and the items 7 and 9 are placed thereon and remain until disturbed or removed.

FIG. 1A is a front view of the item or FIG. 7 used with the kit 100 of FIG. 1. This is described further hereunder.

FIG. 1B is a rear view of the item or FIG. 7 shown in FIG. 1A, used with the kit 100 of FIG. 1. This is described further hereunder. In FIG. 1B, a negative of the value of FIG. 1A is provided.

FIG. 1C is a front view of the item or FIG. 9 used with the kit of FIG. 1. This is described further hereunder.

FIG. 1D is a rear view of the item or FIG. 9 shown in FIG. 1C, used with the kit 100 of FIG. 1. This is described further hereunder. In FIG. 1D, a negative of the value of FIG. 1C is provided.

Figure 2:
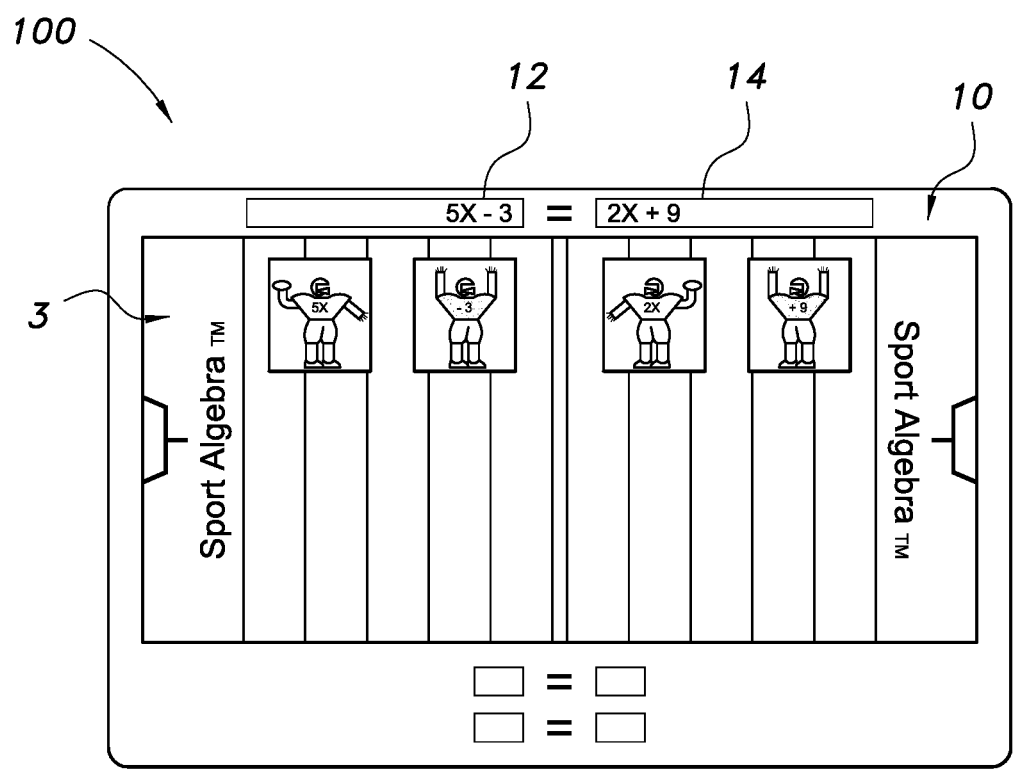
FIG. 2 shows the kit of the present invention, having an arrangement for depicting the equation 5X−3=2X+9.

FIG. 2 shows the kit 100 of the present invention, having an arrangement of items 7 and 9 for depicting the equation $5X-3=2X+9$.

In the preferred embodiment of the present invention, a representation of an algebraic equation as shown in FIG. 1 is used to teach the notion that all equations have two sides which must always be equal. Items/figures 7 including the variable "X" are used to represent a unit amount of an unknown quantity, and items/figures 9 having values without the variable "X" are used to represent numerical values 9. Both items/figures 7 and 9 are arranged on the sport playing field 3 to represent a given equation. All pieces (the items 7 and 9 being considered "pieces" for the sake of this discussion) on each side of the sport playing field 3 are associated by the concept of simple mathematical grouping, as would be the case with representing items/figures 7 and 9 grouped on opposite sides.

For example, an item/FIG. 9 with the numerical "+7" facing upward next to another item/FIG. 7 which represents an unknown quantity, such as "X" facing upward, would represent the expression "X+7". Additionally, an item/figure 9 with the numerical "−8" facing upward next to another item/figure 7 that represents an unknown quantity "4X" facing upward, would represent the expression "4X−8". Repetitive clusters of items 7 and 9 may be arranged in parallel lines to better show repetition of identical elements. Therefore, two rows, each consisting of an item/figure with "5X" and "+3", is understood to represent "2(5X+3), because it is a repetition of the representational items/figures for "5X+3" two times. The students are taught the concept of an equation through its corresponding arrangement wherein movements are employed which do not disturb the equality of the arrangement. In a series of lessons, the students are taught that solutions to equations are determined by grouping the same type of items/figures on opposite sides. These movements are counterparts to important algebraic concepts, such as grouping and combining like terms. Hence, this invention and the corresponding movements determine a model and process to represent both an algebraic linear equation and its algebraic solution. Specifically, and as mentioned above, FIG. 2 shows an arrangement for the equation $5X-3=2X+9$.

Figure 3A:
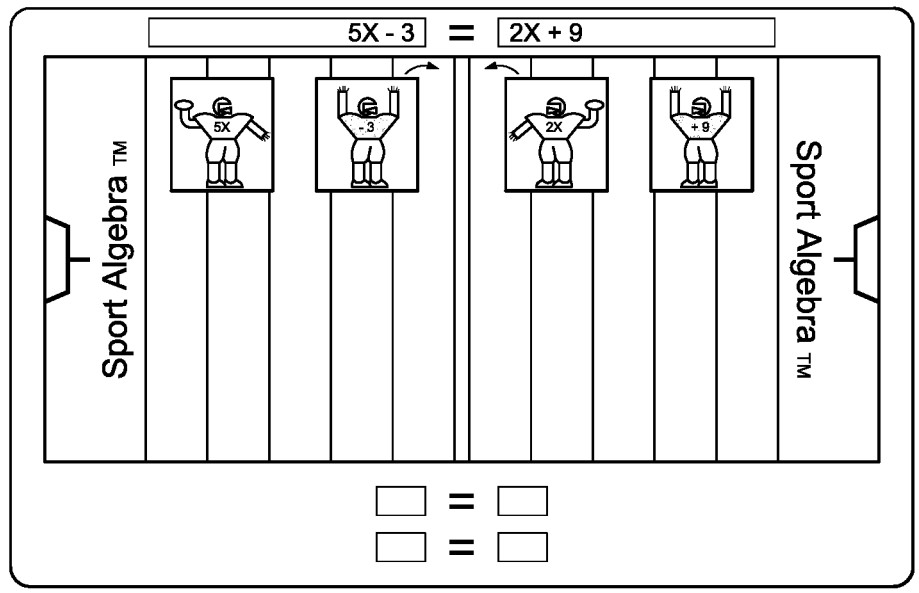
Figure 3B:
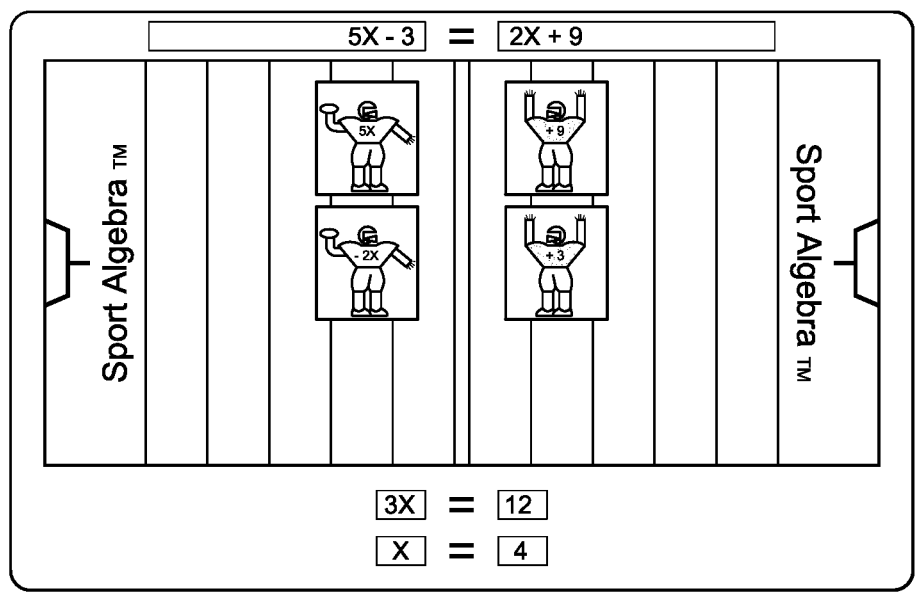

FIG. 3A and FIG. 3B together show a step-by-step process for moving the items/figures 7 representing a unit amount of an unknown quantity including a variable "X" and items/figures 9 representing numerical values to simplify and solve the given equation, in which FIG. 3A depicts a first step of this process and FIG. 3B depicts a second step of this process. This process is discussed further hereunder.

Figure 4:
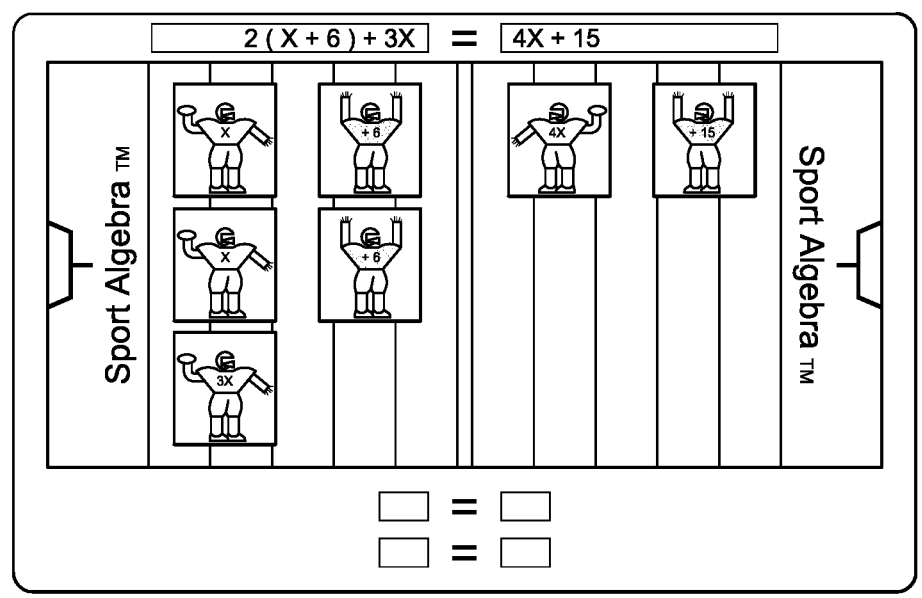
FIG. 4 shows an arrangement of the equation 2(X+6)+3X=4X+15.

FIG. 4 shows an arrangement of the equation $2(X+6)+3X=4X+15$.

Figure 5A:
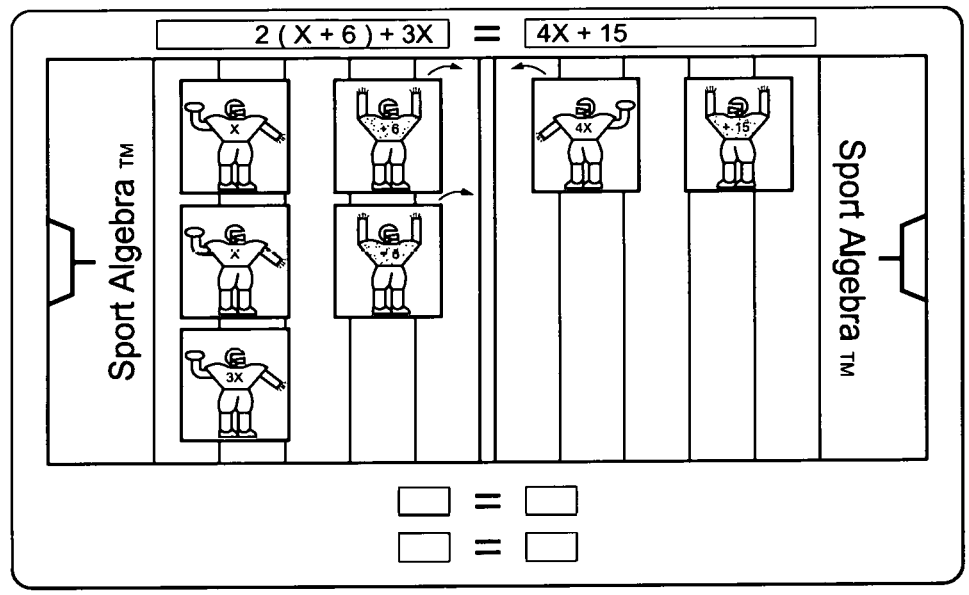
FIG. 5A and FIG. 5B together show a step-by-step movement of the items/figures to arrive at a solution to the equation.
Figure 5B:
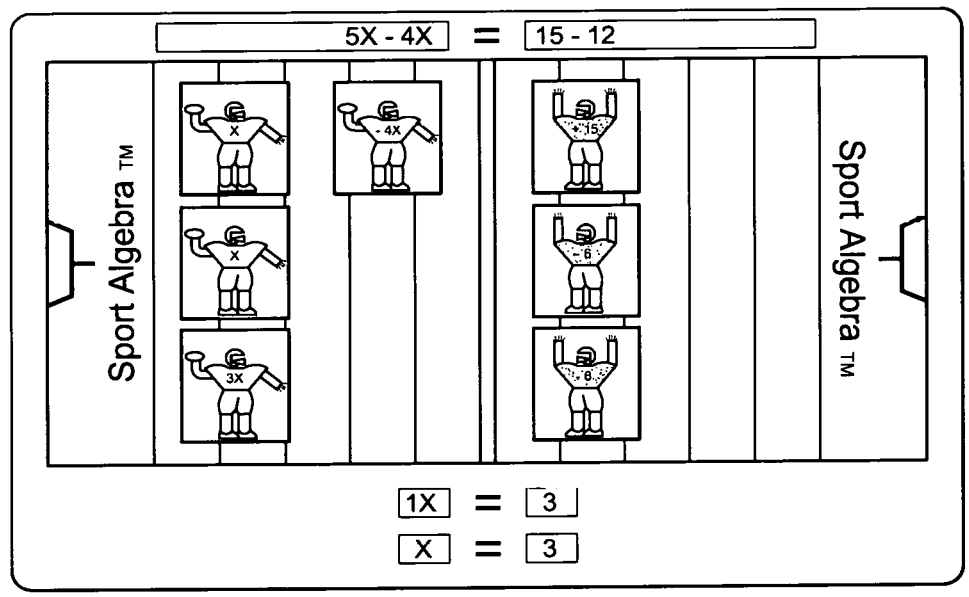

FIG. 5A and FIG. 5B together show a step-by-step movement of the items/figures 7 and 9, to arrive at a solution to the equation. This process is discussed further hereunder.

In FIG. 3A and in FIG. 3B, arrows are shown in which the direction of the arrows indicates where the items/figures 7 and 9 are to be moved. In FIG. 3A, which is step 1 of the solution process, the process involves grouping like items/figures 7 and 9 on opposites sides by simultaneously moving the items/figures 7 representing the unknown amount "X" to one side and moving the items/figures representing the numerical values 9 to the opposite side, whereby students are able to visualize like terms gathered on opposite sides of the equal sign. This is indicated in step 1 and yields the result shown in step 2 which is illustrated in FIG. 3B. Step 3 is shown at the bottom of FIG. 3B, the result of individually totaling the values of the items/figures 7 and 9 that are on each side. On one side the unknown amounts ("x") are totaled and on the other side the numerical values are totaled. At this point in the example, an unknown value 3X is disposed on the left side and a numerical value 12 is disposed on the right side. Students are then asked if they know 3 times what value equals 12. And the answer of 4 then is therefore intuitively obvious as the solution to the equation which is X=4. One can check this answer with the initial given equation to verify that the solution is correct.

FIG. 5A and FIG. 5B together show the same type of step-by-step solution of the given equation of FIG. 4 which requires the same type of step-by-step simultaneous movement of the items/figures 7 and 9 of the equation in FIG. 2 to arrive at an answer. This is indicated in step 1 shown in FIG. 5A and yields the result shown in step 2 shown in FIG. 5B. Step 3 is shown at the bottom of FIG. 5B, and is the result of individually totaling the values of the items/figures 7 and 9 that are on each side. On one side the unknown amounts are totaled and on the other side the numerical values are totaled. At this point there is an unknown value 1X on the left side and a numerical value 3 on the right side. Students are then asked if they know 1 times what value equals 3. And the answer of 3 then is therefore intuitively obvious as X=3. One can check this answer with the initial given equation to verify that the solution is correct.

In the aforementioned steps of FIG. 3A, FIG. 3B, FIG. 5A, and FIG. 5B, the solution can be facilitated by the following operations. When moving a card bearing the item/figure 7 or the card bearing item/figure 9 from one side of the centerline (unnumbered in the figures), that card is flipped over to thus show the negative of the amount originally shown. The front and reverse sides are typical of those shown in FIGS. 1A and 1B; and in FIG. 1C and FIG. 1D.

The following discussion explains the above text and drawings using different terminology, providing another way of explaining the invention.

The invention is directed to an educational kit for solving a given linear algebraic equation having a solution, comprising a plurality of non-masking objects 7, each of said plurality of non-masking objects respectively representing a unit amount of an unknown quantity by mirroring/duplicating said unit amount of an unknown quantity (see FIG. 1A, FIG. 1B, FIG. 1, FIG. 2, and FIG. 4). The invention further includes a plurality of non-counting unit objects 9, each of said plurality of non-counting unit objects representing a numerical value by mirroring/duplicating said numerical value (FIG. 1C, FIG. 1D, FIG. 1, FIG. 2, FIG. 4), without use of masking said non-counting unit objects, whereby said non-counting unit objects 9 with numerical values and said non-masking objects 7 with unit amounts of an unknown quantity are arranged to form said given linear algebraic equation by mirroring/duplicating said given linear algebraic equation without the use of masking said non-counting unit objects and thereafter rearranged according to rules of movement in order to simplify said given linear algebraic equation without the use of masking said non-counting unit objects until the value of the unknown quantity is obvious, all said non-masking objects and said non-counting unit objects being the only articles used for representing elements of said given linear algebraic equation without any indicator means for representing said given linear algebraic equation by mathematical operations.

Further, the objects representing a unit amount of an unknown quantity by mirroring/duplicating said unit amount of an unknown quantity are two-sided objects 7. More specifically, the two-sided objects representing a unit amount of an unknown quantity by mirroring/duplicating said unit amount of an unknown quantity are cards 7, see FIG. 1A, FIG. 1B, FIG. 3A, FIG. 5A, and FIG. 5B.

Additionally, the objects representing a numerical value by mirroring/duplicating said numerical value are two-sided objects 9. More specifically, the two-sided objects representing a numerical value by mirroring/duplicating said numerical value are cards 9, see FIG. 1C, FIG. 1D, FIG. 3A, FIG. 3B, FIG. 5A, and FIG. 5B.

The facility of this manipulative system is greatly enhanced by the use of the setting associated with a sport and the sport competitive figures which enable students to quickly learn the concept of grouping like terms in order to solve linear equations. Furthermore it should be understood that there are many modifications and adaptations to the embodiment of the invention outlined herein which still fall within the scope and spirit of the invention. It is not, therefore, intended that the specific embodiments described herein be a limitation upon the scope of the invention which shall be determined by the appended claims and their legal equivalents.

What is claimed is:

1. An educational kit for solving a linear algebraic equation having a solution, said linear algebraic equation having a left side, a right side, and an equals sign separating said left side and said right side, comprising:

a display board having, a top edge, a bottom edge, a left side, a right side, and a border region; a sport playing field, said sport playing field being printed on said display board, for simulating playing a specific game associated with a specific competitive sport;

a first pair of equation boxes printed in said border region near said top edge of said display board, said first pair of equation boxes being separated by an equals sign for writing said left-hand side of said linear algebraic equation and said right-hand side of said linear algebraic equation; a first pair of solution boxes printed on said display board in said border region near said lower edge, and a second pair of solution boxes printed in said border region below said first pair of solution boxes; said first pair of solution boxes being separated by an equals sign for showing on one side all amounts where a single variable "x" is written in said pair of equal boxes and showing on an opposite side all amounts of numeric values in said pair of equation boxes; and said second pair of solution boxes being separated by an equals sign wherein a numerical solution of the said linear algebraic equation is written as a numerical value;

one or more two-sided non-masking objects and one or more two-sided non-counting unit objects respectively representing a first team on one side and a second team on an opposite side, said first team and said second team being opposing teams associated with said specific competitive sport, each of said two-sided non-masking objects and each of said two-sided non-counting unit objects respectively representing either said first team or said second team, each of said non-masking units respectively having printed a same "X" value on both sides but of opposite signs for identifying and distinguishing the said first team represented by said non-masking objects from said second team represented by said non-counting unit objects, each of said non-counting unit objects respectively representing said first team having printed a positive value on one side and a negative value on an opposite side for identifying said first team represented by said non-counting unit objects from said second team represented by said non-masking unit objects, said sport playing field having a left side and a right side;

whereby said non-counting unit objects and said non-masking objects are arranged on said left and right sides of said sport playing field to form said linear algebraic equation by mirroring/duplicating said linear algebraic equation without use of masking said non-counting unit objects and thereafter are rearranged according to algebraic rules of movement in order to simplify said linear algebraic equation without use of masking said non-counting unit objects thereby forming respective rearranged non-counting unit objects and respective rearranged non-masking objects such that all said rearranged non-counting unit objects representing said first team and all said rearranged non-masking objects representing said second team remain on both said left and said right sides of said sport playing field, with no additional non-counting unit objects and no additional non-masking objects being progressively added to said sport playing field until said solution to said linear algebraic equation is reached, wherein all said non-masking objects and said non-counting unit objects being the only articles used for representing elements of said given linear algebraic equation and solving said given linear algebraic equation without any indicator means for representing said linear algebraic equation by mathematical operations.

2. The educational kit of claim 1, wherein said non-masking objects respectively representing an opposing team associated with a specific competitive sport used to form said linear algebraic equation by mirroring/duplicating said linear algebraic equation are twosided for representing the same "X" value on both sides but of opposite signs.

3. The educational kit of claim 2, wherein said two-sided objects respectively representing said non-masking objects representing an opposing team associated with a specific competitive sport used to form said linear algebraic equation by mirroring/duplicating said linear algebraic equation are cards for representing the same "X" value on both sides but of opposite signs.

4. The educational kit of claim 1 wherein said non-counting unit objects representing an opposing team associated with a specific competitive sport used to form said linear algebraic equation by mirroring/duplicating said linear algebraic equation are two-sided for representing positive value on one side and negative value on the other side.

5. The educational kit of claim 4 wherein said two-sided non counting unit objects representing an opposing team associated with a specific competitive sport used to form said linear algebraic equation by mirroring/duplicating said linear algebraic equation are cards for representing positive value on one side and negative value on the other side.

* * * * *